US011130642B2

(12) United States Patent
Bunge (10) Patent No.: US 11,130,642 B2
(45) Date of Patent: Sep. 28, 2021

(54) METHOD AND DEVICE FOR SEPARATION OF LONG PARTS

(71) Applicant: OST—OSTSCHWEIZER FACHHOCHSCHULE, Rapperswil (CH)

(72) Inventor: Rainer Bunge, Alpthal (CH)

(73) Assignee: OST—OSTSCHWEIZER FACHHOCHSCHULE, Rapperswil (CH)

( * ) Notice: Subject to any disclaimer, the term of this patent is extended or adjusted under 35 U.S.C. 154(b) by 41 days.

(21) Appl. No.: 16/559,936

(22) Filed: Sep. 4, 2019

(65) Prior Publication Data

US 2020/0171546 A1 Jun. 4, 2020

(30) Foreign Application Priority Data

Jul. 4, 2018 (CH) .................................... 00837/18

(51) Int. Cl.
*B07B 1/04* (2006.01)
*B65G 47/57* (2006.01)
(Continued)

(52) U.S. Cl.
CPC ............... *B65G 47/42* (2013.01); *B07B 1/04* (2013.01); *B07B 7/01* (2013.01); *B65G 47/57* (2013.01);
(Continued)

(58) Field of Classification Search
CPC .... B07B 1/06; B07B 1/04; B07B 7/01; B07B 13/003; B07B 13/05; B07B 15/00;
(Continued)

(56) References Cited

U.S. PATENT DOCUMENTS 2,302,532 A  11/1942 Downing, Jr.
3,502,123 A * 3/1970 Randolph ............ B23Q 16/001
                                                      83/79
(Continued)

FOREIGN PATENT DOCUMENTS

DE   196 01 224 A1   7/1997
DE   203 05 434 U1   8/2003
EP   3 597 315 A1    1/2020

OTHER PUBLICATIONS

Communication dated Jun. 5, 2020, from the European Patent Office in European Application No. 19194423.0.

*Primary Examiner* — Charles A Fox
*Assistant Examiner* — Jessica L Burkman
(74) *Attorney, Agent, or Firm* — Sughrue Mion, PLLC (57) ABSTRACT

A device and a method for the separation of elongated parts (long parts) from bulk materials. The device comprises a conveying device (1), a deflecting device (2) and a rake with webs (4) being oriented longitudinally to the conveying direction. According to the method, the bulk material is transported on the conveying device (1), and then long parts (10) are oriented by means of a deflecting device (2) transversely to the conveying direction. After passing through the deflecting device (2), the transversely oriented long parts are transferred to the rake (4) and discharged as coarse materials (7). Compact parts (11) fall through this rake and thus end up in the fine material (6).

24 Claims, 4 Drawing Sheets

(51) Int. Cl.
*B65G 47/42* (2006.01)
*B65G 47/53* (2006.01)
*B07B 7/01* (2006.01)
*B07B 1/06* (2006.01)

(52) U.S. Cl.
CPC ........ *B65G 47/53* (2013.01); *B65G 2201/047* (2013.01); *B65G 2203/0208* (2013.01)

(58) Field of Classification Search
CPC ........ B65G 47/42; B65G 47/22; B65G 47/57; B65G 47/53; B65G 2201/47; B65G 2203/0208; B65G 69/0441; B23Q 7/12
USPC .......................................................... 209/632
See application file for complete search history.

(56) References Cited

U.S. PATENT DOCUMENTS

| | | | |
|---|---|---|---|
| 6,241,097 B1 | 6/2001 | Roman | |
| 2014/0131167 A1* | 5/2014 | Dorr | B65H 9/06 |
| | | | 198/382 |
| 2016/0184866 A1* | 6/2016 | Iwamatsu | B07B 13/003 |
| | | | 241/15 |

* cited by examiner

METHOD AND DEVICE FOR SEPARATION OF LONG PARTS

TECHNICAL FIELD

The invention lies in the field of mechanical processing technology. It relates to a method and a device according to the preambles of the corresponding independent claims. The method and the device serve for the separation of elongated parts (long parts) from bulk materials.

PRIOR ART

By a conventional sifting, bulk material is separated basically in terms of the smallest geometrical cross-section. In this way, long parts with the minimal dimension, the diameter d, end up in the same grain size fraction as "compact" parts of diameter d. For example, elongated pieces of wood and plastic cable tubes slip through the sifting machines of construction waste treatment plants and thus get into the mineral recycling product. In this case, the overly long parts constitute perturbing substances. On the other hand, long parts may also be valuable material. One example of this is elongated stainless steel parts, such as cutlery, which are not easily recoverable in a mechanical manner through conventional processing of trash incinerator ash by means of magnetic separation and eddy current separation.

The state of the art in long part removal from bulk materials is described in patent classes IPC B07B13. The use of special sieves, such as nostril sieves or 3D sieves, is known. These are set up so that elongated parts are transported across a specially structured sieve lining and discharged as coarse material, while compact parts drop down through passages in the sieve lining. Alternatively, primarily horizontally oscillating sieves are used for the separation of elongated parts such as fibres or wires, such as tumbling sieves, where the elongated parts with a diameter less than the mesh width are sorted out as coarse material. Furthermore, there are long part separators in which the elongated parts are oriented in the conveying direction on vibrating conveyors, e.g., by the type of vibration or by webs and grooves on the covering of the vibrating conveyor, and then transported through a gap with vertically offset edge. Short and compact parts fall into the gap, while the elongated parts slide across it.

The described solution approaches are unsatisfactory in that long parts may get stuck in the passages for the fine grain, e.g., in the screen mesh or slots ("jamming grains"). A typical example is nails and screws, whose sharp end goes through the sieve openings, yet whose head end is too wide to pass through these openings. In order to avoid such problems, brushes are used, which comb down elongated parts at the side from the conveying device. The drawback here is that the separation is not very selective and additional mechanical devices are employed, which need to have a separate drive unit.

Furthermore, vibrating conveying devices are known, from which the bulk material drops directly onto a rake, so-called finger sieves. Such devices are not suitable for the separation of long parts because long parts oriented along the conveying direction dive into the rake and drop through it when ejected from the conveying device.

SUMMARY OF THE INVENTION

The object of the present invention is the provision of a method and a device which overcome the drawbacks of the prior art. A preferred object the provision of a device and a method which allow long parts to be removed selectively from a bulk material with grain size distribution $d_{min} < d < d_{max}$ in a robust mechanical manner. The diameter d of a bulk material particle is defined as the smallest clear width of a finger sieve through which the particle can only just pass.

This object is achieved by the device and the method which are defined in the independent patent claims.

According to claim 1, a long part separator for bulk material having long parts and compact parts comprises a conveying device for conveying the bulk material along a conveying direction and a rake, which is situated behind the conveying device when seen in the conveying direction of the conveying device.

The bulk material is fed to the rake. The rake comprises a plurality of interspaces. The interspaces have in a first direction a clear length and in a second direction lying transversely to the first direction a clear width. The clear length for rectangular interspaces is at least twice as large as the clear width. The long part separator furthermore comprises a deflecting device arranged between the conveying device and the rake, which is suitable for orienting the long parts at an angle of 45° to 90° to the first direction transversely to the clear length of the interspaces. In other words, the long parts are oriented preferably transversely to the first direction by the deflecting device.

In other words, the bulk material is transported on the conveying device and then the long parts are oriented by means of a deflecting device transversely to the conveying direction or transversely to the clear length of the interspaces of the rake. After passing through the deflecting device, the transversely oriented long parts are transferred to the rake and can then slide across the rake webs to the coarse material, if these are inclined at an angle and/or excited by vibrations to convey the material. Compact parts drop through this rake and thus get into the fine material. In this way, a simple separation of the bulk material fraction into long parts and compact parts can be achieved without major build-up occurring in the area of the rake.

Preferably, the first direction along which the interspaces extend by the clear length runs parallel to the conveying direction. In this way, the orientation of the long parts can also be defined as transverse to the conveying direction.

The terms "clear length" and "clear width" refer to the dimensions of the interspace with respect to its gap size or clear dimension.

The interspaces of the rake substantially depend on the shape of the rake. In the case of a rake with webs lying parallel to each other, the interspace is substantially rectangular, as seen from above on the rake. The rake webs preferably run parallel to the conveying direction. But the rake may also have a different configuration, for example, the interspace may be triangular or take on a different shape.

The term "bulk material" refers for example to combustion cinders, biowaste or construction waste. The term "long part" defines a part which is typically substantially larger in its length extension than in its transverse extension, i.e., the diameter. In other words, the long parts have a diameter which is smaller than the length. The maximum diameter of the long parts is preferably smaller than the clear width of the interspaces on the rake. Preferably, the long parts have a length which is at least twice as large as the clear width of the rake. The term "compact part" refers to a part whose diameter and length extension are substantially equal.

Preferably, the deflecting device is designed as an obstacle such that long parts oriented longitudinally to the conveying direction strike against the deflecting device substantially at the front end and are rotated in the desired direction by the impact. The conveying device serves as a driving means for the orienting of the long parts.

The deflecting device may have various configurations. As already mentioned, it is configured or designed such that the long parts are oriented by the deflecting device relative to the interspaces of the rake.

In a first embodiment, the deflecting device comprises a plate arranged transversely to the conveying direction. The bulk material coming from the conveying device strikes against the plate and the long parts are oriented by the plate such that the long parts are inclined at an angle or lie transversely to the first direction or to the clear length of the rake.

The plate is preferably arranged at the front end of the conveying device and extends to beneath a plane which is defined by the conveying surface of the conveying device.

The plate comprises a substantially flat or level impact surface, against which the bulk material strikes. The impact surface stands substantially transverse to the conveying direction or transverse to the first direction with the clear length.

In a first variant of the first embodiment, the plate is arranged movably relative to the conveying device, in particular in a swiveling or swinging manner. This provides the benefit that any build-up of material between the ejection edge of the conveying device and the plate can be easily removed by moving the plate. In particular, the plate is arranged such that the plate can be swiveled away from the conveying device, so that the gap between the plate and the conveying device becomes larger.

In a second variant of the first embodiment, the plate is arranged firmly relative to the conveying device. This arrangement is especially advantageous when material build-up can be largely excluded. The firmly arranged plate in one modification can be coupled to a vibration exciter, so that the plate is placed in vibration. In this way, any build-up of material can be removed.

Preferably, the distance between the plate and the front end of the conveying device is less than four times the clear width of the rake. That is to say, expressed in a formula:

distance between the plate and the front end of the conveying device <4 x clear width Especially preferably, the distance is less than twice the clear width of the rake. That is to say, expressed in a formula:

distance between the plate and the front end of the conveying device <2 x clear width The choice of the distance in the mentioned limits enables an especially good separation of the long parts.

The front end of the conveying device is the end of the conveying device facing toward the plate.

In a second embodiment, the deflecting device comprises a chute. The chute is adjacent to the front end of the conveying device. The chute is preferably arched or concavely rounded or inclined at an angle to the conveying surface. Between the chute and the bulk material parts, a substantially point-like contact is produced during the sliding process, whereby the long parts on the chute are swiveled into the aforementioned orientation.

In a third embodiment, the deflecting device comprises the aforementioned plate and the aforementioned chute. The plate here is arranged at a distance from the chute.

In the following, advantageous modifications to all of the above embodiments shall be described.

Preferably, the rake is coupled to a vibration exciter. In this way, any material build-up on the rake can be easily removed.

Preferably, a baffle plate is installed between the deflecting device and the rake. The orientation of the long parts can be further improved by the baffle plate.

Preferably, the conveying device conveys material by vibrating.

A method according to the invention is also claimed. Accordingly, a method serves for separating long parts from bulk material, especially with a long part separator as described above. The bulk material is transported via a conveying device and transferred from this to a rake. The rake comprises a plurality of interspaces, having in a first direction a clear length and in a second direction lying transversely to the first direction a clear width. The long parts are oriented at an angle of 45° to 90°, or substantially transversely to the first direction, i.e., transversely to the clear length of the interspaces, by a deflecting device situated between the conveying device and the rake.

Thanks to this method, long parts can be easily and efficiently separated from the compact parts.

In other words, according to the method of the invention, the bulk material is transported on the conveying device. Long parts are oriented by a deflecting device situated in the region of the front end of the conveying device transversely to the conveying direction. After passing through the deflecting device, the now transversely oriented long parts are transferred to the rake and discharged through its webs as coarse material. Compact parts with a diameter smaller than the clear width drop through this rake and thus get into the fine material.

The method according to the invention and two exemplary embodiments of the corresponding device are described in detail with the aid of the figures.

BRIEF DESCRIPTION OF THE DRAWINGS

Preferred embodiments of the invention shall be described in the following with the aid of the drawings, which merely serve as an explanation and should not be interpreted in limiting manner. The drawings show.

Figure 1:
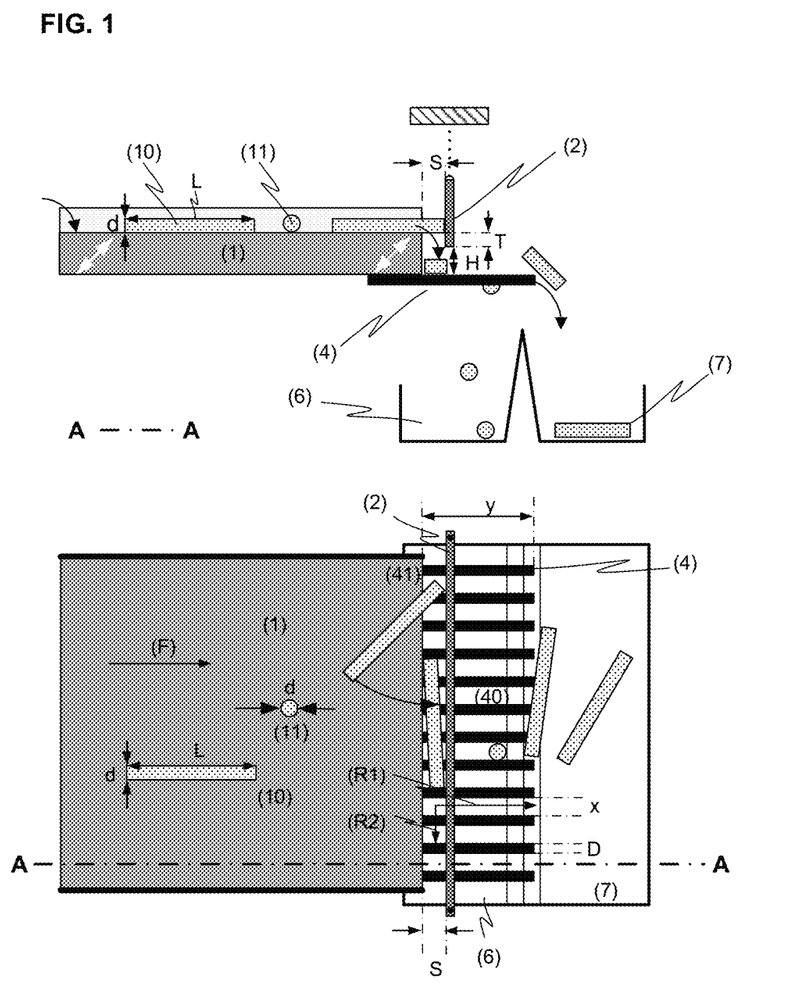
FIG. 1 a schematic view of a device according to a first embodiment seen from the side and from above.
Figure 2:
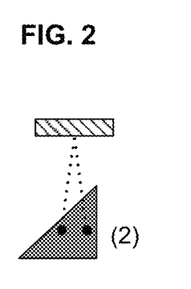
FIG. 2 a schematic view of a triangular deflecting device

FIG. 1 shows a first exemplary embodiment of the device according to the invention for separating long parts with diameter d from compact parts, likewise with diameter d, from a bulk material with grain size distribution $d_{min}<d<d_{max}$. The long parts (10) are preferably defined as being parts having a length L>2 d. Parts with preferably L<2 d are "compact parts" (11). The bulk material is transported by means of the conveying device (1), which preferably vibrates in a linear manner, wherein the long parts (10) have a tendency to orient themselves in the conveying direction. The deflecting device (2) in this case is a plate installed transversely to the conveying direction behind the front end of the conveying device. Whereas compact parts (11) drop across the front end of the conveying device through the rake (4) into the fine material (6), long parts oriented along the conveying direction strike against the deflecting device (2), and are turned transversely to the conveying direction until they drop across the front end of the conveying device transversely onto the rake (4), slide through its webs, and thus are ejected into the coarse material (7). The deflecting device (2) sketched in FIG. 1 is generally a steel plate, which is provided e.g. at the front end with a wear protection (such as rubberizing) The deflecting device can be modified in various ways, e.g., by a triangular design as depicted in FIG. 2. In this way, the long parts are lifted somewhat at the front end and are therefore easier to move transversely. Preferably, the deflecting device sketched in FIG. 1 is installed such that it can deflect in the event of a possible material build-up (e.g., suspended in a pendulum-like manner as sketched in FIG. 1). When the conveying device is very wide, the deflecting device is advantageously designed in the form of individual segments placed next to each other. To assist in the deflection, the front end of the deflecting device sketched in FIG. 1 may also have a "corrugated sheet" or "zigzag" design (when seen from above). Typical dimensions of this embodiment of the device according to the invention are:

$d_{min} < d < d_{max} < x < L/2$
$D = 0.2x \ldots 2x$
$S = x \ldots 2.5x$
$H = 1.5x \ldots 2.5x$
$T = 0.5x \ldots x$ Here, x is the clear width of the rake. Experiments have shown that, with typical dimensions, good separator results are to be expected for particles with length $L > 3x$ and very good results for particles with $L > 5x$.

Figure 3:
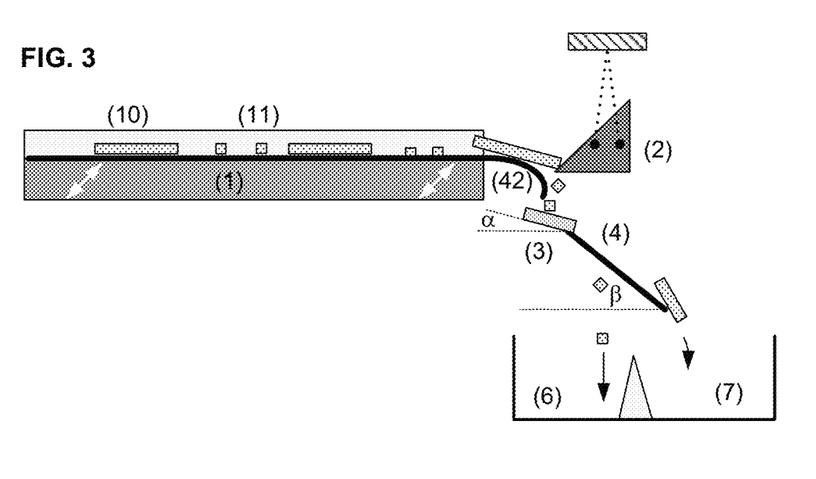
FIG. 3 a schematic view of a conveying device with a chute and a baffle plate

FIG. 3 shows a second exemplary embodiment of the device according to the invention. Vibrating conveyors are considered primarily as the conveying device (1), but also vibrating sieves, for example. In the embodiment depicted in FIG. 3, the ejection region of the conveying device is configured as a curved chute (42), so that an ideally point-like contact surface is produced between the long parts (10) and the chute, which favours the transverse positioning of the long parts by the deflecting device (2). The chute is preferably curved in the form of a quarter circular arc segment with radius R. It has proven to be especially favourable to select the radius R depending on the length L of the long parts being separated as follows: $L/2 < R < 2L$. On the chute at the front end, long parts striking against the deflecting device rotate about the contact point with the chute and then slide off transversely to the conveying direction. Experiments have shown that it is advantageous to provide a baffle plate (3) after the ejection, which prevents short, not yet fully transversely oriented long parts from getting headfirst into the rake and slipping through the webs of the rake. The baffle plate (3) is installed at an acute angle to the horizontal, preferably at an angle $\alpha < 30°$. Long parts not yet fully oriented transversely to the conveying direction strike against this with their head end, are slowed down and become rotated entirely transversely to the conveying direction by sliding of the rear end on the curved chute and are thus transferred to the rake. The rake (4), if stationary (as shown in FIG. 3), is installed at an angle $\beta$ of preferably $45° \ldots 70°$. In FIG. 3, the conveying device (1) is separate from the baffle plate (3) and the rake (4). It may also be advisable to join these three elements together, especially when the conveying device is a vibrating conveyor and the vibrations also serve to convey the material across the baffle plate and the rake. In these cases, the angles $\alpha$ and $\beta$ may be relatively acute. If the rake is in linear vibration, it may even deliver in a slightly rising manner, in which case $\beta$ becomes negative.

Figure 4:
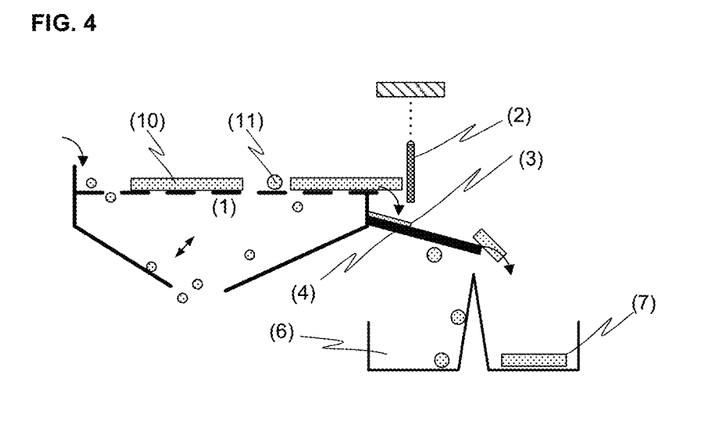
FIG. 4 a schematic view of a conveying device designed as a sieve
Figure 5:
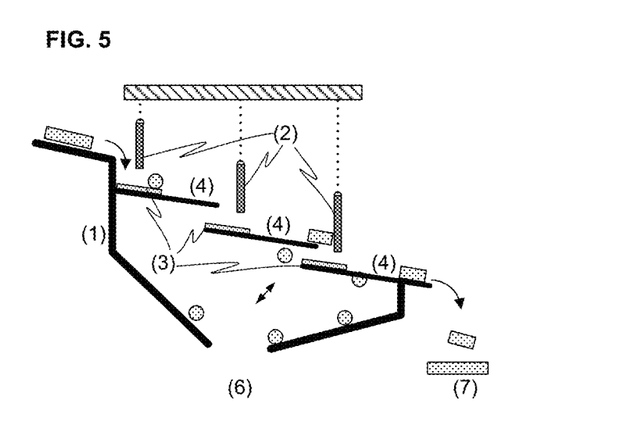
FIG. 5 a schematic view of a three-stage long part separator
Figure 6:
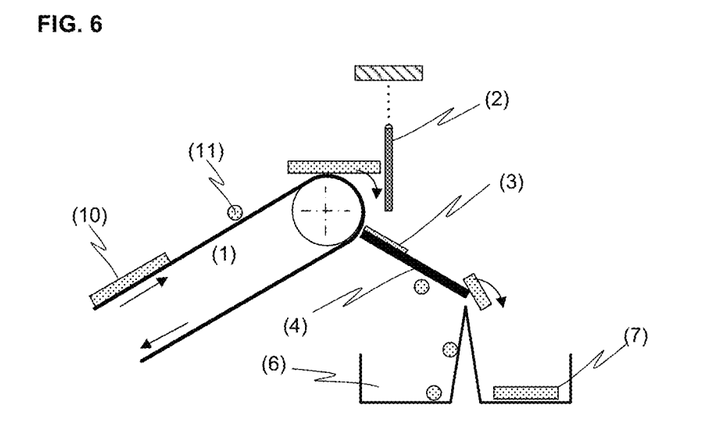
FIG. 6 a schematic view of a conveying device designed as a conveyor belt

The device according to the invention may, as sketched in FIG. 4, be mounted directly on a sieve machine, including a sieve machine with multiple decks. It is especially easy to convert a conventional finger or rod sieve machine ("sizer"), in which the sieve elements are already configured as a rake. Such sieve machines often have several stages for the circulation of the material, and may therefore be easily retrofitted with a deflecting device (2) as sketched in FIG. 1 and, if needed, also with a baffle plate (3) in order to implement the invention (FIG. 5). The conveying device may also be a conveyor belt (FIG. 6), which is combined with the deflecting device (2) depicted in FIG. 1.

Our experiments have shown that a stationary rake can also be used, across which the long parts slide by gravity, as depicted in FIG. 3. It has proven to be advantageous if the rake actively delivers the long parts, e.g., by vibrating. Therefore, it will advantageously be combined with the conveying device as a unit, provided the latter is itself vibrating (e.g., a vibrating conveyor).

Figure 7:
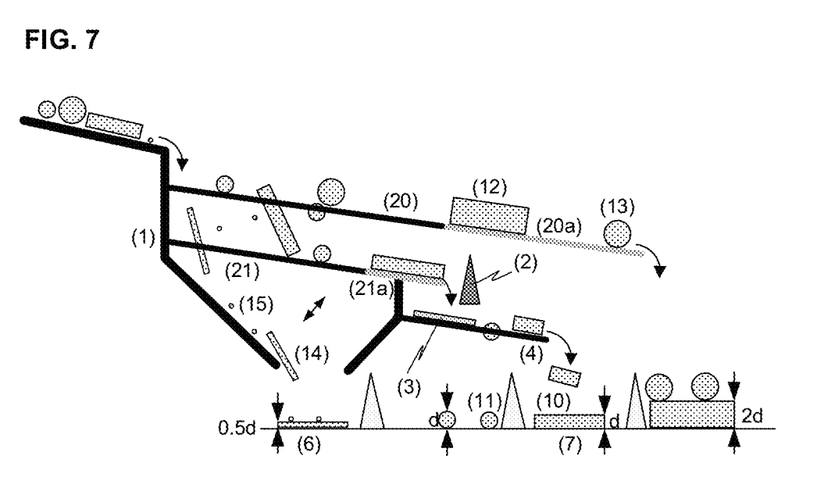
FIG. 7 a schematic view of a long part separator separating by particle diameter in an upper stage, and by particle length in a stage situated underneath.

In order to carry out the method according to the invention, it is advantageous to first sort the bulk material in terms of grain size so that all parts, i.e., both the long parts (10) and the compact parts (11), have a maximum diameter $d_{max}$ which is less than the clear width x of the rake (4). In order to accomplish this free of jamming, the bulk material is first sieved, e.g., on a conventional finger sieve with clear width x, wherein both the long parts (10) with diameter d and the compact parts (11) with diameter d get into the fine material. This fine material is then separated by means of the device according to the invention at the clear width x of the rake (4) such that the long parts (10) are discharged in the coarse material and the compact parts (11) in the fine material. Advantageously, this method is implemented in the combination device (1) sketched in FIG. 7. This consists of the following elements: a coarse grate (20) (e.g., a finger sieve or rod sizer) with clear width $x = 1.7\,d$, a coarse grate chute (20a), a fine grate (21) with clear width $x^* = 0.7\,d$ (such as a finger sieve or rod sizer), a fine sieve chute (21a), a deflecting device (2), a baffle plate (3), and a rake (4) with clear width $x = 1.7\,d$. Parts (14) (15) with grain size $< 0.7\,d$ drop, regardless of their length, through the coarse grate with clear width x and through the fine grate with clear width $x^*$. Parts (12) (13) with grain size $> 1.7\,d$, regardless of their length, are discharged via the coarse grate chute (20a) in the coarse material of the coarse grate. Parts with a grain size between $0.7\,d$ and $1.7\,d$ (10) (11) fall through the coarse grate, then migrate across the fine grate and reach the rake (4) via the fine grate chute (21a) and the deflecting device (2). Here, they are separated according to their length.

The webs of the rake (4) are preferably parallel rods with a circular or triangular cross-section. However, one may also use webs tapering in the conveying direction, e.g., wedge-shaped webs, or also webs flattened on top. Our experiments have confirmed the rule of thumb, derived from theoretical considerations, that for a good separation of compact parts (11) with diameter d, the long parts (10) must meet the following conditions:

$d < x$
$L > 2(x+D)$ where d is the diameter of the long parts and L is their length, x is the clear width of the rake, and D is the width of the webs of the rake. In the case of interspaces (40) not being rectangular as seen from above (but instead wedge-shaped for example), and thus have a variable gap dimension, the clear width (x) is the largest gap dimension, i.e., the largest spacing, between neighbouring webs.

LIST OF REFERENCE SYMBOLS

1 Conveying device
2 Deflecting device
3 Baffle plate
4 Rake
4 Fine material
5 Coarse material
6 Long parts
7 Compact parts
10, 11 Bulk material
20 Coarse grate
20a Coarse grate chute
21 Fine grate
21a Fine grate chute
40 Interspaces of rake webs
41 Front end of conveying device
42 Chute
D Diameter of rake webs
d Diameter of bulk material particles
L Length
F Conveying direction
R1 First direction
R2 Second direction
S Horizontal distance between the front end of the conveying device and the deflecting device
T Vertical distance between the lower edge of the deflecting device and the front end of the conveying device
H Vertical distance between the lower edge of the deflecting device and the rake or baffle plate (if present)
x Clear width (gap size) of the interspaces of the rake
y Clear length of the interspaces of the rake

The invention claimed is:

1. A long part separator for bulk material having long parts and compact parts comprising
a conveying device for conveying the bulk material along a conveying direction and
a rake,
wherein the rake comprises a plurality of interspaces, having in a first direction a clear length and in a second direction lying transversely to the first direction a clear width,
wherein the long part separator furthermore comprises a deflecting device arranged between the conveying device and the rake, which is suitable for orienting the long parts at an angle of 45° to 90°, or substantially transversely, to the first direction or to the clear length of the interspaces,
wherein the deflecting device comprises a plate arranged transversely to the conveying direction, and
i) wherein the plate is arranged movably relative to the conveying device in a swiveling or swinging manner about an axis that runs perpendicular to the conveying direction; or
ii) wherein the plate is arranged firmly relative to the conveying device.

2. The long part separator according to claim 1, wherein the first direction along which the interspaces extend by the clear length runs parallel to the conveying direction.

3. The long part separator according to claim 1, wherein the deflecting device is designed as an obstacle for the long parts, such that long parts oriented longitudinally to the conveying direction strike against the deflecting device substantially at a front end of the conveying device.

4. The long part separator according to claim 1, wherein at least one of the rake is coupled to a vibration exciter and/or a baffle plate is installed between the deflecting device and the rake; and the conveying device conveys material by vibrating.

5. The long part separator according to claim 1, wherein the deflecting device is arranged such, that long parts being deflected by the deflecting device are slid across the rake along a further conveying direction being parallel to the conveying direction.

6. The long part separator according to claim 1, wherein at least one of:
i) the plate extends to beneath a plane that is defined by a conveying surface of the conveying device, or
ii) the plate is arranged in a suspended manner.

7. The long part separator as claimed in claim 1, wherein the rake is situated beneath the conveying device.

8. The long part separator as claimed in claim 1, wherein a horizontal distance between the plate and a front end of the conveying device forms a slot extending transversely to the conveying direction, and wherein the long parts being deflected by the deflecting device are transferred to the rake via said slot.

9. The long part separator according to claim 1, wherein the deflecting device is configured such, that the long parts striking against the deflecting device are lifted at a front end of the long parts.

10. The long part separator according to claim 1, wherein a horizontal distance between the plate and the front end of the conveying device is smaller than four times the clear width of the rake.

11. The long part separator according to claim 10, wherein the horizontal distance between the plate and the front end of the conveying device is smaller than twice the clear width of the rake.

12. The long part separator according to claim 1, wherein the deflecting device comprises a chute, wherein the chute is adjacent to the front end of the conveying device.

13. The long part separator according to claim 12, wherein the chute is curved or concavely rounded or inclined at an angle to the conveying surface of the conveying device.

14. The long part separator as claimed in claim 1, wherein the deflecting device comprises a lower edge and the conveying device comprises a front end, and wherein the lower edge of the deflecting device and the front end of the conveying device are arranged at a vertical distance from one another.

15. The long part separator as claimed in claim 14, wherein the vertical distance is equal to or smaller than the clear width of the rake.

16. The long part separator according to claim 1, wherein the deflecting device comprises a lower edge, and wherein the lower edge of the deflecting device and the rake are arranged at a vertical distance from one another.

17. The long part separator as claimed in claim 16, wherein the vertical distance is 2.5 times the clear width of the rake or smaller.

18. The long part separator according to claim 1, wherein at least one of:
i) the deflecting device is designed as an obstacle for the long parts such, that an impact is generated when the long parts strike against the deflecting device, and wherein the long parts are rotated by the impact, or
ii) the conveying device serves as a driving means for the orienting of the long parts.

19. The long part separator according to claim 18, wherein the plate is arranged movably relative to the conveying device; or wherein the plate is arranged firmly relative to the conveying device.

20. A long part separator for bulk material having long parts and compact parts comprising:
   a conveying device for conveying the bulk material along a conveying direction and
   a rake,
   wherein the rake comprises a plurality of interspaces, having in a first direction a clear length and in a second direction lying transversely to the first direction a clear width,
   wherein the long part separator furthermore comprises a deflecting device arranged between the conveying device and the rake, which is suitable for orienting the long parts at an angle of 45° to 90°, or substantially transversely, to the first direction or to the clear length of the interspaces, and wherein at least one of:
   i) the deflecting device comprises a lower edge and the conveying device comprises a front end, and wherein the lower edge of the deflecting device and the front end of the conveying device are arranged at a vertical distance from one another and with respect to a direction running from a plane being defined by a conveying surface of the conveying device towards beneath said plane, or
   ii) the deflecting device comprises a plate arranged transversely to the conveying direction, and wherein the plate extends to beneath a plane that is defined by a conveying surface of the conveying device.

21. A method for separating long parts from bulk material,
   wherein the bulk material is conveyed via a conveying device and transferred from said conveying device to a rake,
   wherein the rake comprises a plurality of interspaces, having in a first direction a clear length and in a second direction lying transversely to the first direction a clear width,
   wherein the long parts are oriented at an angle of 45° to 90°, or substantially transversely to the first direction with the clear length of the interspaces by a deflecting device situated between the conveying device and the rake,
   wherein the deflecting device comprises a plate arranged transversely to the conveying direction, and
   wherein the plate is arranged firmly relative to the conveying device; or wherein at least one of:
   i) the plate is arranged movably relative to the conveying device in a swiveling or swinging manner about an axis that runs perpendicular to the conveying direction, or
   ii) the plate extends to beneath a plane that is defined by a conveying surface of the conveying device.

22. The method according to claim 21, wherein the long parts to be separated have a diameter which is smaller than the clear width of the rake.

23. The method according to claim 21, wherein the long parts to be separated have a length which is greater than twice the clear width of the interspace of the rake.

24. The method according to claim 21, wherein the bulk material has already been classified before being placed on the conveying device such that the diameter of the long parts is less than the clear width of the rake.

* * * * *